United States Patent
Jiang (12)

(10) Patent No.: US 9,075,433 B1
(45) Date of Patent: Jul. 7, 2015

(54) INFORMATION PROCESSING METHOD AND ELECTRONIC DEVICE

(71) Applicants: Beijing Lenovo Software LTD., Beijing (CN); Lenovo (Beijing) Limited, Beijing (CN)

(72) Inventor: Xingping Jiang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/226,954

(22) Filed: Mar. 27, 2014

(30) Foreign Application Priority Data

Dec. 27, 2013 (CN) .......................... 2013 1 0741714

(51) Int. Cl.
*G06F 3/01* (2006.01)

(52) U.S. Cl.
CPC ....................... *G06F 3/01* (2013.01)

(58) Field of Classification Search
CPC ......... G09G 5/00; G01S 19/19; G06F 19/321; G06F 19/3487
See application file for complete search history.

(56) References Cited

U.S. PATENT DOCUMENTS

2013/0271301 A1* 10/2013 Kabel et al. ................... 340/987

* cited by examiner

*Primary Examiner* — Gerald Johnson
(74) *Attorney, Agent, or Firm* — Westman, Champlin & Koehler, P.A.

(57) ABSTRACT

An information processing method for avoiding that an electronic device becomes out of control is disclosed. The method comprises: determining the controlled electronic device is in a first control mode, and determining a first display format of M objects to form a first graphic display interface; displaying the first graphic display interface; obtaining a switching instruction for instructing the controlled electronic device to switch from the current first control mode to the second control mode; determining a second display format of the M objects on the first graphic display interface to form a second graphic display interface, in response to the switching instruction; and displaying the second graphic display interface. The present invention also discloses an electronic device.

10 Claims, 5 Drawing Sheets

---

101 — Determine an controlled electronic device is in a first control mode, and determine a first display format of M objects to form a first graphic display interface

102 — Display the first graphic display interface of the M object on the display unit, the first graphic display interface is displayed for facilitating interactive input in the first control mode when the controlled electronic device is in the first control mode

103 — Obtain a switch instruction for instructing the controlled electronic device to switch from the first control mode to the second control mode

104 — Determine a second display format of the M objects on the first graphic display interface to form a second graphic display interface, in response to the switch instruction

105 — Display the second graphic display interface of the M object on the display unit, the second graphic display interface is displayed for facilitating interactive input in the second control mode when the controlled electronic device is in the second control mode

INFORMATION PROCESSING METHOD AND ELECTRONIC DEVICE

CROSS-REFERENCE TO RELATED APPLICATION

This Application is a non-provisional Application of Chinese Application No. CN 201310741714.3, filed Dec. 27, 2013, in Chinese, the contents of which are hereby incorporated by reference in their entirety.

TECHNICAL FIELD

The present invention relates to computer technology, and particularly to information processing methods and electronic devices.

BACKGROUND

With development of science and technology, electronic technology is rapidly developing. There are more types of electronic products, and people enjoy conveniences brought by the evolution of science and technology. Nowadays, by using various types of electronic devices, people can enjoy comfortable lives brought by the science and technology development. For instance, electronic devices, such as mobile phones, have already become indispensable to people's lives. People can enhance communication with others by making phone calls or texting using electronic devices, such as mobile phones.

Conventionally, for some electronic devices with large-size screens, they can be used in various manners. For example, the electronic device may be used in one manner when it is lying flat, while it can be used in another manner when it is standing. When used in different use manner, the electronic device can be controlled in different manners.

Generally, when an electronic device is lying flat, a user may control it directly using a touch. When the electronic device is standing, the user may control it using another electronic device, such as remote control, which is convenient for the user. However, a scenario may be considered in which the electronic device is first in a lying flat mode, the user opens some files in the electronic device, and the files may be scattered and displayed on the display screen of the electronic device. Then, the user places the electronic device in a standing mode. At this time, a remote control may be used to control the electronic device. Because the individual files are scattered over the display screen, and the remote control has a limited number of keys, there is a risk that these files may be out of control. This will bring the electronic device into an out-of-control state.

SUMMARY

Embodiments of the present invention provide information processing method and electronic devices for solve the problem in the conventional technology that the electronic device may fall into an out-of-control state when it is switched to a different manner of use.

An information processing method in a controlled electronic device having a display unit, the controlled electronic device can operate in a first control mode and a second control mode; the first control mode is a proximate operation mode, and the second control mode is a remote operation mode; the first control mode is different from the second control mode; the method comprises:

determining the controlled electronic device is in the first control mode, and determining a first display format of M objects to form a first graphic display interface;

displaying the first graphic display interface of the M objects on the display unit, wherein the first graphic display interface is displayed to facilitate interactive input in the first control mode when the controlled electronic device is in the first control mode;

obtaining a switching instruction for instructing the controlled electronic device to switch from the first control mode to the second control mode;

determining a second display format of the M objects on the first graphic display interface to form a second graphic display interface, in response to the switching instruction;

displaying the second graphic display interface of the M object on the display unit, wherein the second graphic display interface is displayed to facilitate interactive input in the second control mode when the controlled electronic device is in the second control mode.

Preferably, the controlled electronic device has a first use posture and a second use posture, the first use posture is a use posture when the controlled electronic device is approximately parallel to a support surface for the controlled electronic device, the second use posture is a use posture when the controlled electronic device is approximately perpendicular to the support surface for the controlled electronic device, said obtaining a switching instruction comprises:

obtaining, by a sensing unit of the controlled electronic device, a sensing parameter representing that the controlled electronic device changes from the first use posture to the second use posture;

generating the switching instruction based on the sensing parameters.

Preferably, the method further comprises, in response to the switching instruction:

obtaining N objects which are display objects suitable for the controlled electronic device being in the second use posture, $N \geq 1$;

forming the second graphic display interface according to the second display format with the N objects and the M objects.

Preferably, said displaying the second graphic display interface of the M objects on the display unit comprises displaying the M objects and at least part of the N objects on the display unit.

Preferably, the method further comprises, after displaying the second graphic display interface of the M objects on the display unit:

obtaining first operation information;

controlling the display unit to display the N objects and at least part of the M objects, in response to the first operation information.

An electronic device having a display unit, the electronic device can operate in a first control mode and a second control mode; the first control mode is a proximate operation mode, and the second control mode is a remote operation mode; the first control mode is different from the second control mode; the electronic device comprises:

a determining module configured to determine the controlled electronic device is in the first control mode, and determine a first display format of M objects to form a first graphic display interface;

a first operation module configured to display the first graphic display interface of the M object on the display unit, wherein the first graphic display interface is displayed to facilitate interactive input in the first control mode when the controlled electronic device is in the first control mode;

an obtaining module configured to obtain a switching instruction for instructing the controlled electronic device to switch from the first control mode to the second control mode;

a responding module configured to determine a second display format of the M objects on the first graphic display interface to form a second graphic display interface, in response to the switching instruction;

a second operation module configured to display the second graphic display interface of the M object on the display unit, wherein the second graphic display interface is displayed to facilitate interactive input in the second control mode when the controlled electronic device is in the second control mode.

Preferably, the electronic device has a first use posture and a second use posture, the first use posture is a use posture when the controlled electronic device is approximately parallel to a support surface for the controlled electronic device, the second use posture is a use posture when the controlled electronic device is approximately perpendicular to the support surface for the controlled electronic device, the obtaining module is configured to obtain a sensing parameter using a sensing unit of the controlled electronic device, the sensing parameter representing that the controlled electronic device changes from the first use posture to the second use posture, and generate the switching instruction based on the sensing parameter.

Preferably, the responding module is further configured to obtain N objects which are display objects suitable for the controlled electronic device being in the second use posture, N≥1, form the second graphic display interface according to the second display format with the N objects and the M objects.

Preferably, the second operation module is configured to display the M objects and at least part of the N objects on the display unit.

Preferably, the obtaining module is further configured to obtain first operation information;

the responding module is further configured to control the display unit to display N objects and at least part of the M objects in response to the first operation information.

In the embodiments of the present invention, when the controlled electronic device is in the first control mode, the switching instruction is obtained to switch the controlled electronic device from the first control mode to the second control mode, and the display unit is caused to display the second graphic to facilitate interactive input in the second control mode. For example, consider a scenario in which the controlled electronic device is first in a lying flat mode, a user opens some files in the electronic device, and these files may be scattered and displayed on the display screen of the controlled electronic device. Then, the user places the controlled electronic device in a standing mode. At this time, a remote control may be used to control the controlled electronic device. With the method of an embodiment of the present invention, the files scattered over the display screen can be rearranged to form a second graphic interface that can be operated by the remote control. In this way, the files can be operated with the remote control, thereby avoiding the controlled electronic device to fall into an out-of-control state. Therefore, the controlled electronic device can be normally controlled no matter what operation mode the controlled electronic device is in, and this ensures that the controlled electronic device can operate normally.

DETAILED DESCRIPTION OF THE EMBODIMENTS

Figure 1:
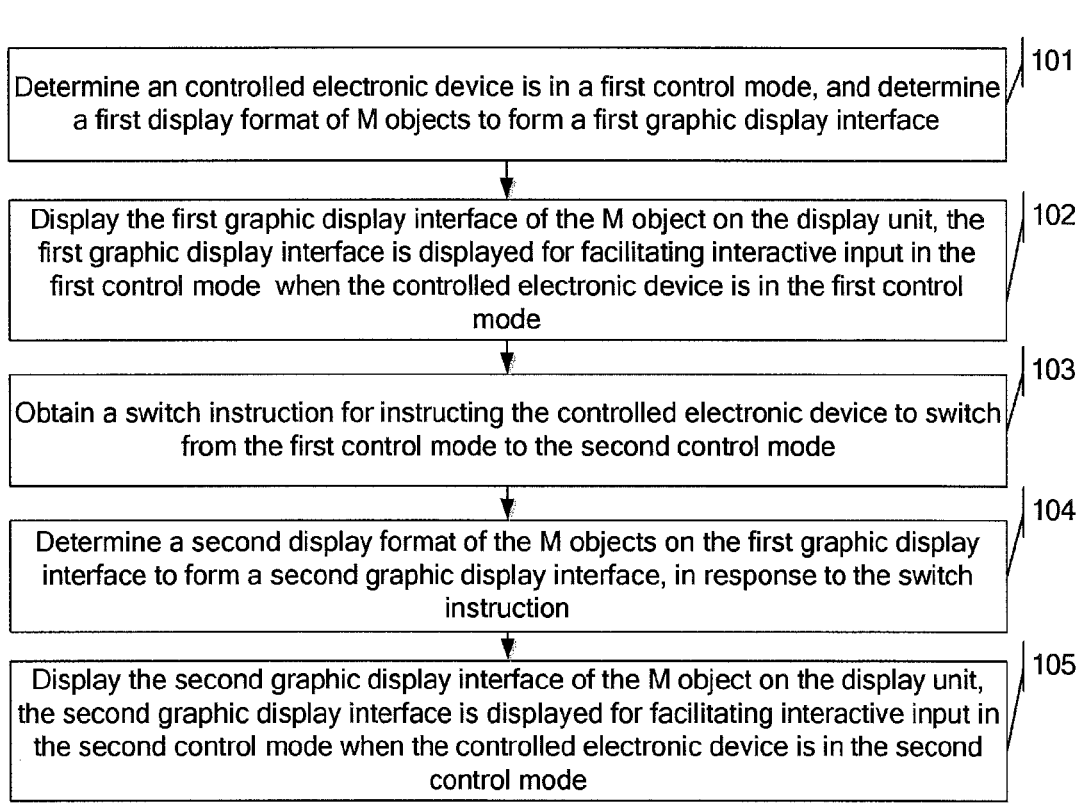
FIG. 1 is a flow diagram of an information processing method according to an embodiment of the present invention.

An information processing method according to an embodiment of the present invention may be applied in a controlled electronic device having a display unit. The controlled electronic device can operate in a first control mode and a second control mode; the first control mode is a proximate operation mode and the second control mode is a remote operation mode; the first control mode is different from the second control mode; the method comprises: determining the controlled electronic device is in the first control mode, and determining a first display format of M objects to form a first graphic display interface; displaying the first graphic display interface of the M objects on the display unit, wherein the first graphic display interface is displayed to facilitate interactive input in the first control mode when the controlled electronic device is in the first control mode; obtaining a switching instruction for instructing the controlled electronic device to switch from the first control mode to the second control mode; determining a second display format of the M objects on the first graphic display interface to form a second graphic display interface, in response to the switching instruction; displaying the second graphic display interface of the M object on the display unit, wherein the second graphic display interface is displayed to facilitate interactive input in the second control mode when the controlled electronic device is in the second control mode.

In the embodiments of the present invention, when the controlled electronic device is in the first control mode, the switching instruction is obtained to switch the controlled electronic device from the first control mode to the second control mode, and the display unit is caused to display the second graphic to facilitate interactive input in the second control mode. For example, consider a scenario in which the controlled electronic device is first in a lying flat mode, a user opens some files in the electronic device, and these files may be scattered and displayed on the display screen of the controlled electronic device. Then, the user places the controlled electronic device in a standing mode. At this time, a remote control may be used to control the controlled electronic device. With the method of an embodiment of the present invention, the files scattered over the display screen can be rearranged to form a second graphic interface that can be operated by the remote control. In this way, the files can be operated with the remote control, thereby avoiding the controlled electronic device to fall into an out-of-control state. Therefore, the controlled electronic device can be normally controlled no matter what operation mode the controlled electronic device is in, and this ensures that the controlled electronic device can operate normally.

In order to further explain the object, solutions and advantages of the embodiments of the present invention, the solutions of the embodiments of the present invention will be clearly and thoroughly described in connection with figures in the embodiments of the present invention. The described embodiments are part, not all, of embodiments of the present invention. Other embodiments obtained by those ordinary skilled in the art without any inventive effort based on the embodiments of the present invention will fall into the scope of the present invention.

In the embodiments of the present invention, the controlled electronic device may be various electronic devices such as PC (personal computer), notebook, PAD (tablet computer), mobile phone etc., which are not limited in the present invention.

Additionally, the term "and/or" herein merely denotes a relationship between objects including three types of relationship, e.g. A and/or B may represent only A, both A and B, or only B. Additionally, the character "/" herein generally represents a relationship of "or" between objects.

Preferred implementations of the present invention are illustrated in detail below in connection with figures.

Referring to FIG. 1, an information processing method in a controlled electronic device having a display unit is provided according to an embodiment of the present invention. The controlled electronic device can operate in a first control mode and a second control mode; the first control mode is a proximate operation mode and the second control mode is a remote operation mode; the first control mode is different from the second control mode. "Proximate" indicates that a distance between an operator and the controlled electronic device is short, while "remote" indicates that the distance between the operator and the controlled electronic device is long. The flow of the method is as follows.

Step 101: Determining the controlled electronic device is in a first control mode, and determine a first display format of M objects to form a first graphic display interface.

Preferably, in the embodiments of the present invention, the controlled electronic device may have at least a first use posture and a second use posture. The first use posture corresponds to the first control mode, and the second use posture corresponds to the second control mode. That is, when the controlled electronic device is in the first use posture, it indicates that the controlled electronic device is in the first control mode. When the controlled electronic device is in the second use posture, it indicates that the controlled electronic device is in the second control mode.

Figure 2:
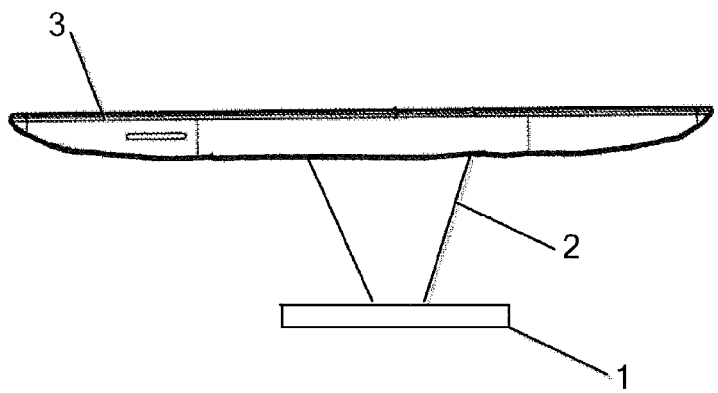
FIG. 2 is a schematic diagram of a controlled electronic device in a first usage mode according to an embodiment of the present invention.

Preferably, in the embodiments of the present invention, the first use posture may be a use posture where the controlled electronic device is approximately parallel to a support surface for the controlled electronic device, as shown in FIG. 2. PAD is shown as an example of the controlled electronic device in FIG. 2. The PAD, for example, may include a support section which comprises one support body 1 and two support poles 2. The support body 1 can be rotated around the two support poles 2 relative to the main body 3 of the PAD, and thus the use posture of the PAD can be changed, that is, the control mode of the PAD can be correspondingly changed.

Alternatively, the PAD may not have a support section. When the PAD is lying flat on the support surface, the PAD is in the first use posture. The support surface illustrated in the embodiments of the present invention may be desktop, a ground surface or other support surfaces. Preferably, the plane in which the support surface is located is a horizontal plane.

Preferably, in the embodiments of the present invention, the second use posture may be a use posture where the controlled electronic device is approximately perpendicular to the support surface for the controlled electronic device, or the second use posture may be a use posture where the controlled electronic device is parallel to a hang-up surface. For example, in the case of a wall-mounted smart television, the wall is the hang-up surface.

Figure 3:
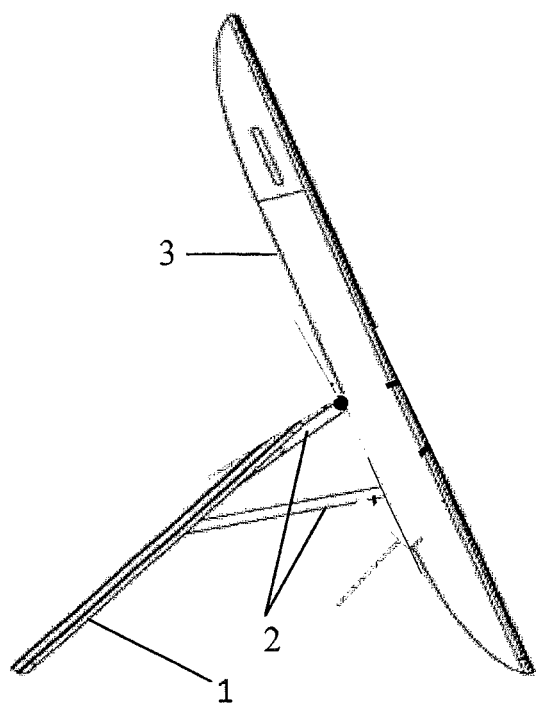
FIG. 3 is a schematic diagram of a controlled electronic device in a second usage mode according to an embodiment of the present invention.

As depicted in FIG. 3, the PAD is still used as an example of the controlled electronic device, and the PAD may be the same as that depicted in FIG. 2. In FIG. 3, the support section supports the main body of the PAD to be approximately perpendicular to the support surface.

The controlled electronic device is in the first control mode. For instance, the display unit displays the M objects which may be icon objects. In the first control mode, the display format of the M objects is determined as the first display format in which the M objects constitute the first graphic display interface.

Step 102: Displaying the first graphic display interface of the M object by the display unit. The first graphic display interface is displayed for facilitating interactive input in the first control mode when the controlled electronic device is in the first control mode.

The determined first graphic display interface may be displayed by the display unit. Interactive input in the first control mode may be facilitated by displaying the first graphic display interface when the controlled electronic device is in the first control mode.

The first control mode is the proximate control mode. Generally, when the controlled electronic device is in the first control mode, a user can directly control the controlled electronic device with his or her finger, that is, the operator may be the user's finger. However, the operator may also be other devices such as a capacitive stylus, mouse, keyboard etc. which are not limited in the present invention.

Figure 4:
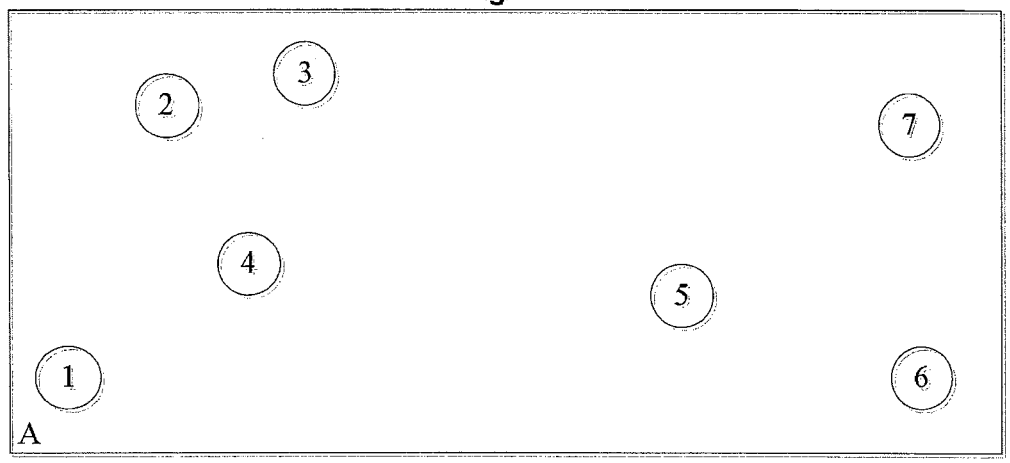
FIG. 4 is a schematic diagram of a display unit when a controlled electronic device is in a first control mode according to an embodiment of the present invention.

FIG. 4 is a schematic diagram of the M objects displayed on the display unit when the controlled electronic device is in the first use posture. In FIG. 4, A denotes the display unit, and small circles represent objects, for example, when M=7, the objects are represented by numbers 1 to 7, respectively. In the first display format, the M objects constitute the first graphic display interface. It can be seen from FIG. 4 that the M objects are distributed on the display unit in a scattered manner. The user has a good control of the controlled electronic device even when the M objects are scattered, because at this time, the user is operating the controlled electronic device in proximity by using an operator such as his or her finger, and thus can operate the controlled electronic device flexibly.

For example, when the user wants to operate on a small circle numbered 1 in FIG. 4, he or she may touch the small circle with his or her finger, and the controlled electronic device will respond to the user's operation.

Step 103: Obtaining a switching instruction for instructing the controlled electronic device to switch from the current first control mode to the second control mode.

Preferably, in the embodiments of the present invention, there may be various ways to obtain the switching instruction. For example, there may be a switch, either a hardware switch or a software switch, on the controlled electronic device. When the switch is triggered, the switching of control mode is triggered.

Preferably, when the use posture of the controlled electronic device changes, the controlled electronic device may be triggered to switch the control mode, because the controlled electronic device has at least the first use posture and the second use posture, and there is a one-to-one correspondence between the use postures and the control modes.

The controlled electronic device may have a sensing unit that obtains a sensing parameter of the controlled electronic device. The sensing parameter may represent different use postures of the controlled electronic device. That is, when the use posture of the controlled electronic device changes, the sensing parameter changes correspondingly. By detecting the sensing parameter, it is possible to learn whether the use posture of the controlled electronic device changes.

Accordingly, obtaining the sensing parameter may include: obtaining the sensing parameter by the sensing unit, the sensing parameter representing that the controlled electronic device changes from the first use posture to the second use posture; and generating the switching instruction based on the sensing parameter.

Specifically, the sensing parameter may be obtained by the sensing unit, and at this time, it may be determined that whether the sensing parameter represents that the controlled electronic device changes from the first use posture to the second use posture. If so, the switching instruction may be generated based on the sensing parameter. In this way, the controlled electronic device may obtain the switching instruction.

Preferably, determining whether the sensing parameter represents that the controlled electronic device changes from the first use posture to the second use posture may include determining whether a parameter value of the sensing parameter has changed. If so, the sensing parameter may be determined as representing that the controlled electronic device has changed from the first use posture to the second use posture.

Preferably, determining whether the sensing parameter represents that the controlled electronic device changes from the first use posture to the second use posture may include determining whether a parameter value of the sensing parameter is within a preset range of parameter value. If not, the sensing parameter may be determined as representing that the controlled electronic device has changed from the first use posture to the second use posture.

Alternatively, determining of whether the sensing parameter represents that the controlled electronic device changes from the first use posture to the second use posture may be performed in any other possible method. This is not limited in the present invention.

Step 104: Determining a second display format of the M objects on the first graphic display interface to form a second graphic display interface, in response to the switching instruction.

After obtaining the switching instruction, a second display format of the M objects on the first graphic display interface may be determined, in response to the switching instruction. In the second display format, the M objects constitute a second graphic display interface.

Preferably, the obtaining of the switching instruction indicates that the use posture of the controlled electronic device has changed from the first use posture to the second use posture. The first use posture and the second use posture have been illustrated above. In the embodiments of the present invention, when the controlled electronic device is in the second use posture, a remote control of the controlled electronic device may be enabled. The user cannot control the controlled electronic device with an operator such as finger in the remote control mode. In the embodiments of the present invention, when the controlled electronic device is in the second use posture, other devices may be used to control the controlled electronic device, for example, a device such as a remote control may be used to control the controlled electronic device. That is, in the embodiments of the present inventions, the operator may be or may not be an electronic device.

When some other device, such as electronic device, is used to control the controlled electronic device, it is impossible to control in a way as convenient as using fingers directly. In this case, if the M objects are also distributed on the display unit in a scattered manner as in FIG. 4, the other electronic device such as a remote control may not be able to control these objects.

In the embodiments of the present invention, in response to the switching instruction, the display format of the M objects may be re-determined, that is, the distribution of the M objects may be adjusted on the display unit. The M objects may be arranged on the display unit such that they are presented in a display format to support control of a new operator. The rearranged M objects constitute the second graphic display interface.

Figure 5:
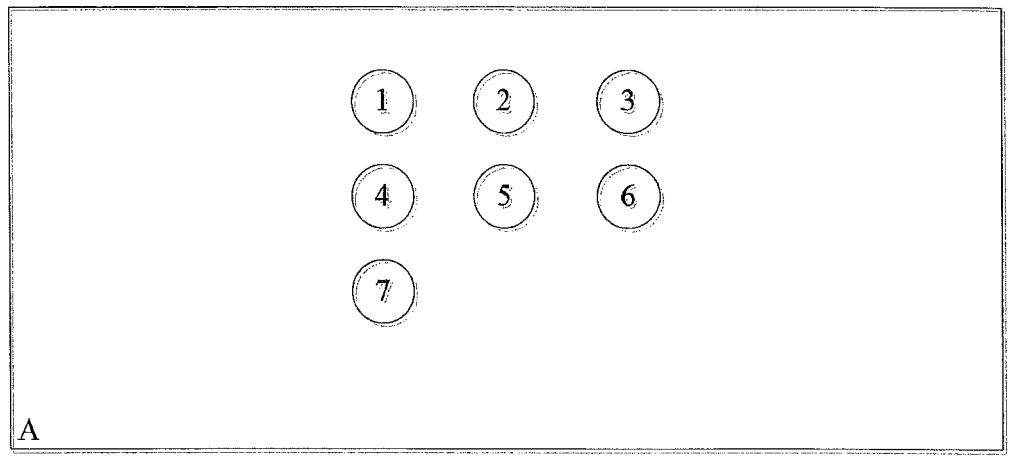
FIG. 5 is a schematic diagram of a display unit when a controlled electronic device is in a second control mode according to an embodiment of the present invention.

For example, FIG. 5 is a schematic diagram of the M objects displayed on the display unit when the electronic device is in the second use posture. In FIG. 5, A denotes the display unit, and small circles represent objects, for example, M=7. The controlled electronic device illustrated in FIG. 5 is the same as that illustrated in FIG. 5. The objects displayed on the display unit remain unchanged except the display format of the 7 objects.

In the second display format, the M objects constitute the second graphic display interface. As can be seen from FIG. 5, the M objects are aligned on the display unit. When the user remotely operates the controlled electronic device with an operator such as a remote control, he or she cannot operate the objects as flexibly as using his or her finger. It is well known that there are multiple rows of keys on a remote control, for example, an up key, a down key, a left key, a right key, and numerical keys. The numerical keys are generally arranged in three rows by three columns on the remote control. Therefore, in FIG. 5, the 7 objects are arranged in three rows by three columns.

Preferably, in the second display format, the arrangement of the M objects may resemble the arrangement of keys on the remote control as much as possible. In this way, the remote control can operate the objects in accordance with a correspondence between the keys and the objects. This may avoid confusion in operation, and thus false response of the controlled electronic device.

Preferably, in the embodiments of the present invention, responding to the switching instruction may further include: obtaining N objects which are suitable for display when the controlled electronic device is in the second use posture, N≥1; and forming the second graphic display interface with the N objects and the M objects based on the second display format.

The N objects are suitable for display when the controlled electronic device in the second use posture. That is, when the controlled electronic device is in the second use posture, some objects, that may not be displayed when the controlled electronic device is in the first use posture, may be displayed. When the controlled electronic device changes from the first use posture to the second use posture, the N objects may be displayed automatically or by a trigger of the controlled electronic device.

For example, in the embodiments of the present invention, in the first use posture, the controlled electronic device may be used in a manner similar to that of a PAD. In the second use posture, the controlled electronic device may be used in a manner similar to that of a smart TV. In this case, the controlled electronic device may be controlled with a remote control.

The N objects may be channel objects. As in a smart TV, multiple channel options, e.g. an object of "entertainment channel" and another object of "sports channel", may be displayed on the display unit for a user to choose. For example, if the user chose "entertainment channel", the controlled electronic device may further display specific channel options on the display unit for further selection by the user. Alternatively, the N objects may also be other objects. The N objects are objects suitable for the second use posture.

The second graphic display interface may be constituted with the M objects and the N objects together. In the second display format, the controlled electronic device may use the M objects and the N objects to constitute the second graphic display interface.

Step 105: Displaying the second graphic display interface of the M object on the display unit, the second graphic display interface being displayed for facilitating interactive input in a second control mode when the controlled electronic device is in the second control mode.

The determined second graphic display interface constituted by the M object may be displayed on the display unit. The user may control the M objects on the second graphic display interface with an operator, when the controlled electronic device is in the second control mode.

Preferably, if the N objects are obtained in addition to the M objects in Step 104, the second graphic display interface is constituted by the M objects and the N objects together. At this time, when displaying the second graphic display interface, the M objects and the N objects are displayed.

Preferably, the second graphic display interface constituted by the M objects and the N objects together may be large, and may extend beyond the display area of the display unit. Therefore, the M objects and the N objects cannot be displayed concurrently, and only part of the second graphic display interface may be displayed. In this case, the M object may be displayed with priority to ensure that all the M objects are displayed on the display unit. After the display of the M objects, the N objects may be displayed. It is impossible to dipslay all the N objects, and thus part of the N objects are displayed. Therefore, the M objects and at least part of the N objects are displayed on the display unit.

In the first use posture, the display unit displays the M objects which may be required by the user. After the controlled electronic device has changed from the first use posture to the second use posture, the M objects are displayed with priority on the display unit to satisfy the user's requirement. Meantime, the N objects are suitable for the second use posture, and thus at least part of the N objects may be displayed for a better control of the controlled electronic device in the second use posture.

Preferably, if all of the M objects and the N objects cannot be displayed, and only part of the N objects are displayed, which object(s) out of the N objects will be displayed may be determined by the controlled electronic device randomly or by the user. By way of example, the controlled electronic device may provide the user with a selection box which contains options corresponding to the N objects. The user may select among the options in the selection box, and the controlled electronic device may display the object(s) selected by the user. The controlled electronic device may notify user in the selection box of how many objects out of the N objects can be displayed.

Further, in the embodiments of the present invention, after displaying the second graphic display interface of the M objects on the display unit, the method may further include obtaining first operation information; and controlling the display unit to display N objects and at least part of the M objects in response to the first operation information.

When the controlled electronic device is in the second use posture, and is similar to a smart TV, and the user wants to use it as a smart TV, the user may want to see the objects suitable for the second user posture, i.e. the N objects, on the display unit. Then, the user may perform a first operation on the controlled electronic device, and the controlled electronic device may obtain the first operation information from the first operation. After obtaining the first operation information, the controlled electronic device may respond to the first operation information by controlling the display unit to display all of the N objects and at least part of the M objects. This can better facilitate the user to operate the N objects.

Preferably, in the embodiments of the present information, when the controlled electronic device is in the second use posture, whether the display unit displays only the M objects, or only the N objects, or the M objects and at least of the N objects, or the N objects and at least part of the M objects, all the displayed objects may be arranged to be suitable for the operation manner of the operator. For example, when the operator is a remote control, the arrangement of all the displayed objects may be suitable for the operation manner of the corresponding remote control.

Figure 6A:
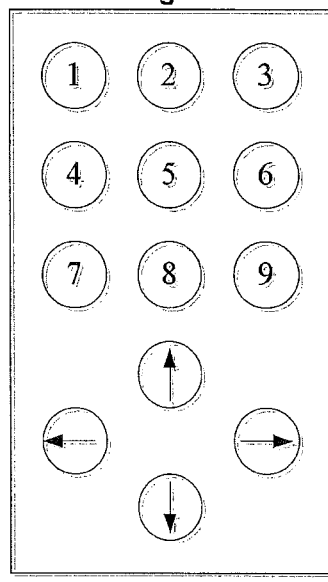
FIG. 6A is a schematic diagram of a key interface of a operator when a controlled electronic device is in a second control mode according to an embodiment of the present invention.

As depicted in FIG. 6A, a schematic diagram of an interface of keys of a remote control is shown. The remote control comprises 9 numerical keys denoting nine integers from 1 to 9. Below the 9 numerical keys, there are 4 keys labeled with arrows including an up key, a down key, a left key and a right key corresponding to the directions represented by the arrows.

For example, 12 objects are displayed on the display unit, and may be the M objects, or the N objects, or all the M object plus part of the N objects, or all the N objects plus part of the M objects.

Figure 6B:
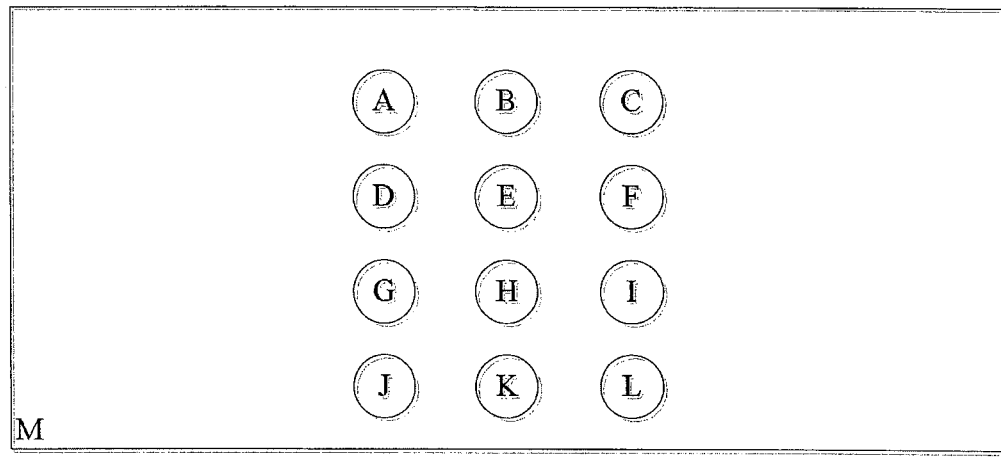
FIG. 6B is a schematic diagram of a display unit when a controlled electronic device is in a second control mode according to an embodiment of the present invention.

Referring to FIG. 6B, a second graphic display interface constituted by 12 objects displayed on the display unit after the controlled electronic device has switched to the second use posture is depicted. The 12 objects are represented by characters from A to L, respectively, and M represents the display unit. It can be seen that the arrangement of the 12 objects is similar to the arrangement of keys on the remote control. When the remote control is used to control the interface, key 1 may control object A, key 2 may control object B, and so on. For instance, when object A, B, and C represent three channels, and the user wants to watch the channel represented by the object A, the user may press key 1 on the remote control. When the controlled electronic device receives the operation of the user, it may acquire information of the object A, and display it on the display unit. When the display unit is displaying the information of the object A, part or none of the objects previously displayed on the display unit may be displayed, depending on whether the display unit displays the information of object A in a full screen.

The remote control has 9 numerical keys, but the number of objects is 12. Preferably, the objects in the bottom row may be controlled with the down key and the numerical keys in an upper row.

Figure 6C:
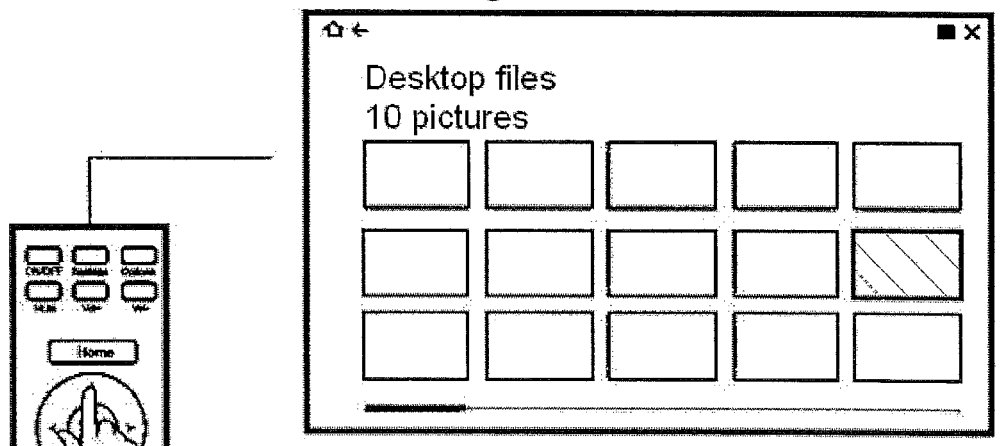
FIG. 6C-6D is schematic diagrams of two control schemes when a controlled electronic device is controlled by a remote control according to an embodiment of the present invention.
Figure 6C:
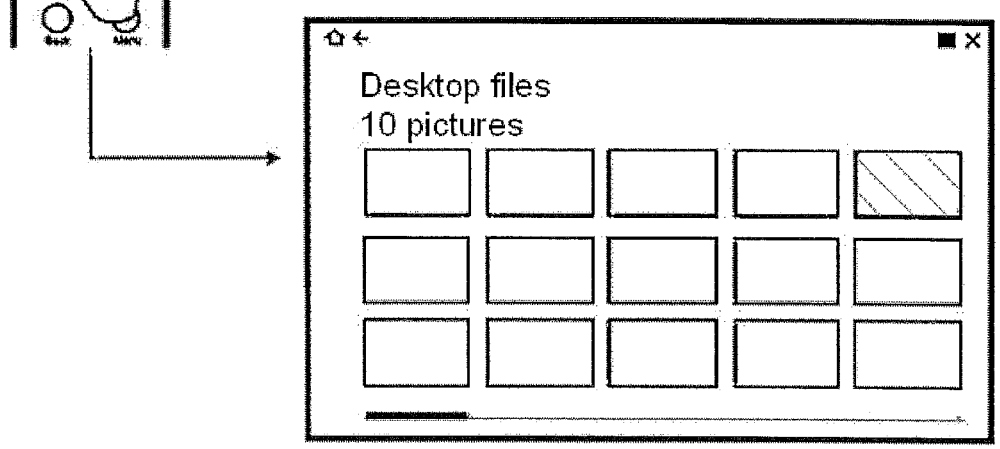
Figure 6D:
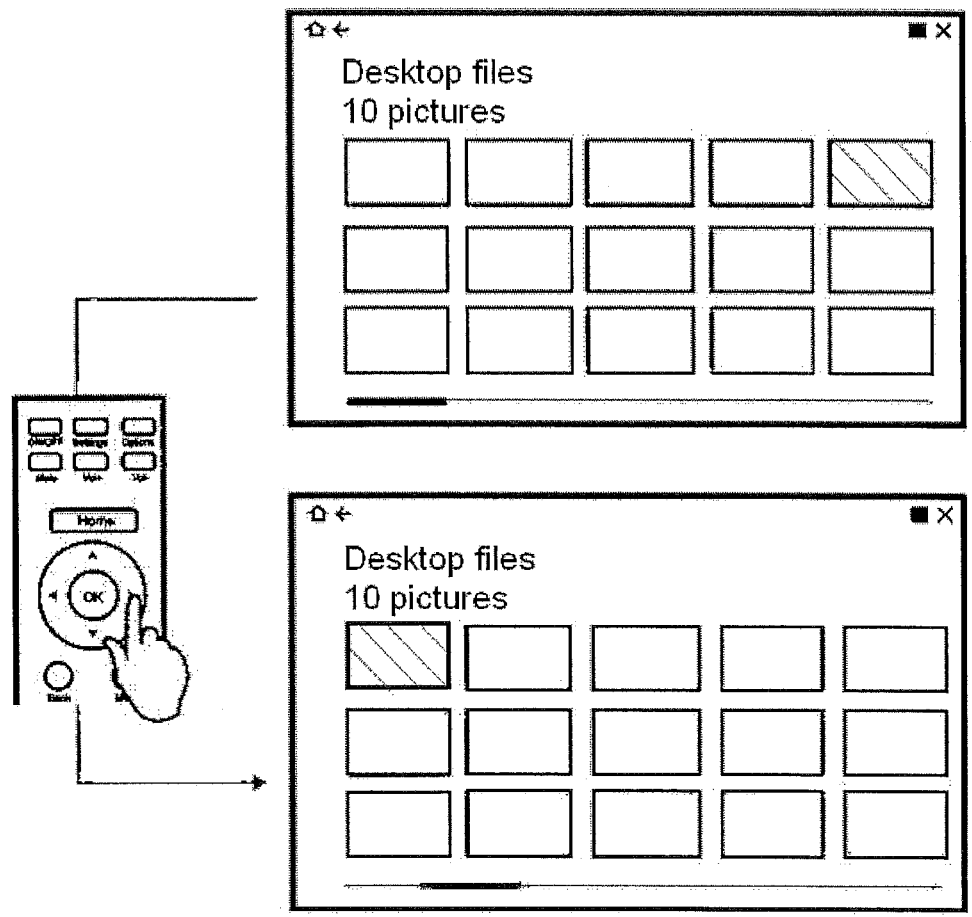

For example, referring to FIG. 6C and FIG. 6D, two possible control schemes in the embodiments of the present invention are illustrated.

A remote control for controlling the controlled electronic device which is in the second use posture is shown on the left side of FIG. 6C. It can be seen that the second graphic interface is displayed on the display unit of the controlled electronic device.

First, refer to the big box on top right side of FIG. 6C which is a schematic diagram of the display unit. At this time, the user has not started operating the interface with the remote control. The small box at the right end of the second row is filled with oblique lines, which indicates that a cursor is staying at the small box on the right end of the second row.

Then, the user operates with the remote control, for example, by pressing the up key on the remote control. Referring to the big box on the bottom right side of FIG. 6C, the small box at the right end of the first row is filled with oblique lines, which indicates that the cursor has moved to the small box at the right end of the first row. That is, the cursor has moved by the user's operation on the remote control.

A remote control for controlling the controlled electronic device which is in the second use posture is shown on the left side of FIG. 6D. It can be seen that the second graphic interface is displayed on the display unit of the controlled electronic device.

First, referring to the big box on top right side of FIG. 6D, a schematic diagram of the display unit is depicted. At this time, user has not started operating the interface with the remote control. The small box at the right end of the second row is filled with oblique lines, which indicates that a cursor is staying at the small box on the right end of the second row. Only 10 pictures can be displayed on the display unit at a time. As can be seen from the progress bar at the bottom of the big box, the first segment of the progress bar is shown in bold, which indicates that the first page of 10 pictures is currently shown.

Then, the user operates the interface with the remote control, for example, by pressing the right key on the remote control. Referring to the big box on the bottom right side of FIG. 6C, the small box at the left end of the first row is filled with oblique lines, which indicates that the cursor has moved to the small box at the right end of the first row. That is, the cursor has moved according to the user's operation on the remote control. Further, as can be seen from the progress bar at the bottom of the big box, the second segment of the progress bar is shown in bold, which indicates that the second page of 10 pictures is currently shown different from those displayed previously in the big box.

The present invention describes one possible control scheme out of all possible control schemes. When the controlled electronic device is in the second use posture, the arrangement of all objects displayed on the display unit may correspond to the arrangement of keys on the operator. There are various control schemes, and this is not limited in the present invention.

Figure 7:
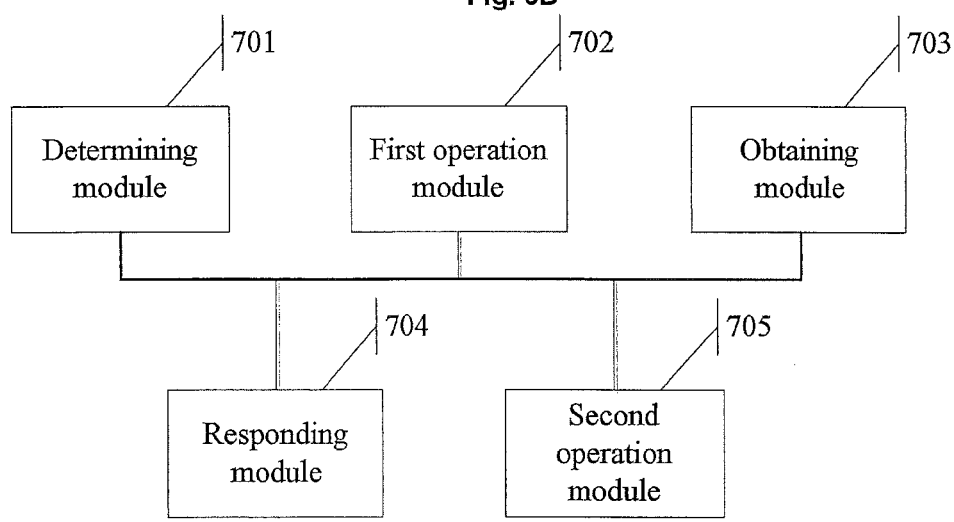
FIG. 7 is a block diagram of a controlled electronic device according to an embodiment of the present invention.

Referring to FIG. 7, an electronic device having a display unit is provided in an embodiment of the present invention. The electronic device may operate in a first control mode and a second control mode; the first control mode is a proximate operation mode and the second control mode is a remote operation mode; the first control mode is different from the second control mode. The electronic device may include: a determining module 701, a first operation module 702, an obtaining module 703, a responding module 704, and a second operation module 705.

Preferably, the electronic device may be the same as the controlled electronic device illustrated above.

The determining module 701 may be configured to determine the controlled electronic device is in a first control mode, and determine a first display format of M objects to form a first graphic display interface.

The first operation module 702 may be configured to display the first graphic display interface of the M object on the display unit, the first graphic display interface be displayed for facilitating interactive input in the first control mode when the controlled electronic device is in the first control mode.

The obtaining module 703 may be configured to obtain a switching instruction for instructing the controlled electronic device to switch from the current first control mode to the second control mode.

The responding module 704 may be configured to determine a second display format of the M objects on the first graphic display interface to form a second graphic display interface, in response to the switching instruction.

The second operation module 705 may be configured to display the second graphic display interface of the M object on the display unit; the second graphic display interface is displayed for facilitating interactive input in the second control mode when the controlled electronic device is in the second control mode.

Preferably, in the embodiments of the present invention, the electronic device has a first use posture and a second use posture. The first use posture is a use posture when the controlled electronic device is approximately parallel to a support surface for the controlled electronic device, and the second use posture is a use posture when the controlled electronic device is approximately perpendicular to the support surface for the controlled electronic device. The obtaining module 703 may be further configured to obtain a sensing parameter of the controlled electronic device, the sensing parameter representing that the controlled electronic device changes from the first use posture to the second use posture, and generate the switching instruction based on the sensing parameter.

Preferably, in the embodiments of the present invention, the responding module 704 may be further configured to obtain N objects which are display objects suitable for the controlled electronic device being in the second use posture, N≥1, and form the second graphic display interface in the second display format with the N objects and the M objects.

Preferably, in the embodiments of the present invention, the second operation module 705 may be further configured to display the M objects and at least part of the N objects on the display unit.

Preferably, in the embodiments of the present invention, the obtaining module 703 may be further configured to obtain first operation information. The responding module 704 may be further configured to control the display unit to display N objects and at least part of the M objects in response to the first operation information.

An information processing method according to an embodiment of the present invention may be applied in a controlled electronic device having a display unit, the controlled electronic device can operate in a first control mode and a second control mode; the first control mode is a proximate operation mode and the second control mode is a remote operation mode; the first control mode is different from the second control mode; the method includes: determining the controlled electronic device is in a first control mode, and determining a first display format of M objects to form a first graphic display interface; displaying the first graphic display interface of the M object on the display unit, the first graphic display interface is displayed for facilitating interactive input of the first control mode when the controlled electronic device is in the first control mode; obtaining a switching instruction for instructing the controlled electronic device to switch from the current first control mode to the second control mode; determining a second display format of the M objects on the first graphic display interface to form a second graphic display interface in response to the switching instruction; and displaying the second graphic display interface of the M object on the display unit, the second graphic display interface is displayed for facilitating interactive input of a second control mode when the controlled electronic device is in the second control mode.

In the embodiments of the present invention, when the controlled electronic device is in the first control mode, the switching instruction is obtained to switch the controlled electronic device from the first control mode to the second control mode, and the display unit is caused to display the second graphic to facilitate interactive input in the second control mode. For example, consider a scenario in which the controlled electronic device is first in a lying flat mode, a user opens some files in the electronic device, and these files may be scattered and displayed on the display screen of the controlled electronic device. Then, the user places the controlled electronic device in a standing mode. At this time, a remote control may be used to control the controlled electronic device. With the method of an embodiment of the present invention, the files scattered over the display screen can be rearranged to form a second graphic interface that can be operated by the remote control. In this way, the files can be operated with the remote control, thereby avoiding the controlled electronic device to fall into an out-of-control state. Therefore, the controlled electronic device can be normally controlled no matter what operation mode the controlled electronic device is in, and this ensures that the controlled electronic device can operate normally.

Those skilled in the art can clearly appreciate that the division of above illustrated functional modules are only exemplified for convenience and clarity. In practical applications, however, the above functions can be reallocated to different functional modules to achieve as needed, i.e., dividing the internal structure of the device into different functional modules to achieve all or part of the functions illustrated above. The specific work processes of the system, appliance, and unit illustrated above can be referred to the corresponding processes of previously described method embodiments, and will be omitted here.

In the several embodiments of the present invention, it should be appreciated that the disclosed system, appliance, and method can be implemented in other ways. For example, the above depicted device embodiments are only illustrative. For instance, the division of the modules or units is only a logic functional division. In practical implementations, other division ways are possible, e.g. multiple units or components could be combined or integrated into another system, or a feature can be omitted or not executed. Another point is that the coupling between each other, or direct coupling, or communicative connection shown or discussed could be indirect coupling or communicative connection through some interfaces, appliances, or units, which could be electric, mechanical, or other forms.

The units explained as discrete components may or may not be physically separated. Components shown as units may or may not be physical units, i.e. may be located in one place or distributed in multiple network units. Part or all of the units can be selected, according to actual requirements, to achieve the object of approaches of the present embodiment.

Additionally, various functional units in the embodiments of the present invention can be integrated in one processing unit, or various units can individually, physically exist, or two or more units can be integrated into one unit. The integrated units discussed above can be implemented in the form of both hardware and software functional units.

When the integrated units are implemented in the form of software functional units, and sold and utilized as self-contained products, they can be stored in one computer readable storage medium. Based on such understanding, substantially, the technical solution of the present invention, or parts of which contribute to the conventional technology, or all or parts of the technical solution can be embodied in the form of software product. The computer software product which is stored in a storage medium includes several instructions which makes a computer device (may be a personal computer, a server, or a network device) or processor to execute all or part of the steps of the methods illustrated in various embodiments of the present application. The storage medium discussed above comprises various medium which can store program codes, such as, flash disks, portable hard drives, Read-Only Memory (ROM), Random Access Memory (RAM), magnetic disc or optical disc etc.

Specifically, the computer program instructions corresponding to the information coding method in the embodiments of the present application can be stored in storage medium such as optical disc, hard drive or flash drive etc. When the computer program instructions corresponding to the information coding method in the storage medium are read and executed by an electronic device, the method is as follows.

An information processing method in a controlled electronic device having a display unit, the controlled electronic device can operate in a first control mode and a second control mode; the first control mode is a proximate operation mode and the second control mode is a remote operation mode; the first control mode is different from the second control mode; the method comprises:

determining the controlled electronic device is in the first control mode, and determining a first display format of M objects to form a first graphic display interface;

displaying the first graphic display interface of the M objects on the display unit, wherein the first graphic display interface is displayed to facilitate interactive input in the first control mode when the controlled electronic device is in the first control mode;

obtaining a switching instruction for instructing the controlled electronic device to switch from the first control mode to the second control mode;

determining a second display format of the M objects on the first graphic display interface to form a second graphic display interface, in response to the switching instruction;

displaying the second graphic display interface of the M object on the display unit, wherein the second graphic display interface is displayed to facilitate interactive input in the second control mode when the controlled electronic device is in the second control mode.

Preferably, the controlled electronic device has a first use posture and a second use posture, the first use posture is a use posture when the controlled electronic device is approximately parallel to a support surface for the controlled electronic device, the second use posture is a use posture when the controlled electronic device is approximately perpendicular to the support surface for the controlled electronic device, said obtaining a switching instruction comprises:

obtaining, by a sensing unit of the controlled electronic device, a sensing parameter representing that the controlled electronic device changes from the first use posture to the second use posture;

generating the switching instruction based on the sensing parameters.

Preferably, the method further comprises, in response to the switching instruction:

obtaining N objects which are display objects suitable for the controlled electronic device being in the second use posture, N≥1;

forming the second graphic display interface according to the second display format with the N objects and the M objects.

Preferably, said displaying the second graphic display interface of the M objects on the display unit comprises displaying the M objects and at least part of the N objects on the display unit.

Preferably, the method further comprises, after displaying the second graphic display interface of the M objects on the display unit:

obtaining first operation information;

controlling the display unit to display the N objects and at least part of the M objects, in response to the first operation information.

Various modifications and variations can be made by those skilled in the art without departing the spirit and scope of the present invention. Thus, if modification and variations of the present invention fall into the scope of the claims of the present invention and equivalents thereof, the present invention also encompass such modification and variations.

What is claimed is:

1. An information processing method in a controlled electronic device having a display unit, the controlled electronic device can operate in a first control mode and a second control mode; the first control mode is a proximate operation mode and the second control mode is a remote operation mode; the first control mode is different from the second control mode; the method comprises:

determining the controlled electronic device is in the first control mode, and determining a first display format of M objects to form a first graphic display interface;

displaying the first graphic display interface of the M objects on the display unit, wherein the first graphic display interface is displayed to facilitate interactive input in the first control mode when the controlled electronic device is in the first control mode;

obtaining a switching instruction for instructing the controlled electronic device to switch from the first control mode to the second control mode;

determining a second display format of the M objects on the first graphic display interface to form a second graphic display interface, in response to the switching instruction;

displaying the second graphic display interface of the M object on the display unit, wherein the second graphic display interface is displayed to facilitate interactive input in the second control mode when the controlled electronic device is in the second control mode.

2. The method of claim 1, wherein, the controlled electronic device has a first use posture and a second use posture, the first use posture is a use posture when the controlled electronic device is approximately parallel to a support surface for the controlled electronic device, the second use posture is a use posture when the controlled electronic device is approximately perpendicular to the support surface for the controlled electronic device, said obtaining a switching instruction comprises:

obtaining, by a sensing unit of the controlled electronic device, a sensing parameter representing that the controlled electronic device changes from the first use posture to the second use posture;

generating the switching instruction based on the sensing parameters.

3. The method of claim 2, further comprising, in response to the switching instruction:

obtaining N objects which are display objects suitable for the controlled electronic device being in the second use posture, N≥1;

forming the second graphic display interface according to the second display format with the N objects and the M objects.

4. The method of claim 3, wherein, said displaying the second graphic display interface of the M objects on the display unit comprises displaying the M objects and at least part of the N objects on the display unit.

5. The method of claim 4, further comprising, after displaying the second graphic display interface of the M objects on the display unit:

obtaining first operation information;

controlling the display unit to display the N objects and at least part of the M objects, in response to the first operation information.

6. An electronic device having a display unit, the electronic device can operate in a first control mode and a second control mode; the first control mode is a proximate operation mode, and the second control mode is a remote operation mode; the first control mode is different from the second control mode; the electronic device comprises:

a determining module configured to determine the controlled electronic device is in the first control mode, and determine a first display format of M objects to form a first graphic display interface;

a first operation module configured to display the first graphic display interface of the M object on the display unit, wherein the first graphic display interface is displayed to facilitate interactive input in the first control mode when the controlled electronic device is in the first control mode;

an obtaining module configured to obtain a switching instruction for instructing the controlled electronic device to switch from the first control mode to the second control mode;

a responding module configured to determine a second display format of the M objects on the first graphic display interface to form a second graphic display interface, in response to the switching instruction;

a second operation module configured to display the second graphic display interface of the M object on the display unit, wherein the second graphic display interface is displayed to facilitate interactive input in the second control mode when the controlled electronic device is in the second control mode.

7. The electronic device of claim 6, wherein, the electronic device has a first use posture and a second use posture, the first use posture is a use posture when the controlled electronic device is approximately parallel to a support surface for the controlled electronic device, the second use posture is a use posture when the controlled electronic device is approximately perpendicular to the support surface for the controlled electronic device, the obtaining module is configured to obtain a sensing parameter using a sensing unit of the controlled electronic device, the sensing parameter representing that the controlled electronic device changes from the first use posture to the second use posture, and generate the switching instruction based on the sensing parameter.

8. The electronic device of claim 7, wherein, the responding module is further configured to obtain N objects which are display objects suitable for the controlled electronic device being in the second use posture, N≥1, form the second graphic display interface according to the second display format with the N objects and the M objects.

9. The electronic device of claim 8, wherein the second operation module is configured to display the M objects and at least part of the N objects on the display unit.

10. The electronic device of claim 9, wherein the obtaining module is further configured to obtain first operation information;

the responding module is further configured to control the display unit to display N objects and at least part of the M objects in response to the first operation information.

\* \* \* \* \*